United States Patent [19]

Lenhart et al.

[11] 4,325,413

[45] Apr. 20, 1982

[54] SUPPORTING SHEATH FOR A LONGITUDINALLY SHIRRED PACKAGING TUBE

[75] Inventors: Richard Lenhart; Armin Köstner, both of Wiesbaden; Günter Gerigk, Oberursel; Klaus-Jürgen Bittner, Wiesbaden, all of Fed. Rep. of Germany

[73] Assignee: Hoechst Aktiengesellschaft, Frankfurt am Main, Fed. Rep. of Germany

[21] Appl. No.: 157,201

[22] Filed: Jun. 6, 1980

[30] Foreign Application Priority Data

Jun. 8, 1979 [DE] Fed. Rep. of Germany ....... 2923188

[51] Int. Cl.³ ..................... F16L 11/08; F16L 11/10
[52] U.S. Cl. ................... 138/109; 138/118.1; 138/178
[58] Field of Search .............. 138/109, 118.1, 178; 53/441, 442, 3; 29/447; 426/105, 135, 138; 206/497, 802, 804

[56] References Cited

U.S. PATENT DOCUMENTS

| 99,018 | 1/1870 | Smith .................. 138/109 |
| 2,150,471 | 3/1939 | Valsen . |
| 2,371,508 | 2/1959 | Hill . |
| 2,933,866 | 4/1960 | Cranston . |
| 3,148,992 | 9/1964 | Hewitt . |
| 3,446,634 | 5/1969 | Stahlberger . |
| 3,528,825 | 9/1970 | Doughty . |
| 3,639,130 | 2/1972 | Eichin et al. ........... 138/118.1 |
| 3,864,494 | 2/1975 | Kupcikevicus et al. ..... 426/105 X |
| 3,942,568 | 3/1976 | Stemmler . |
| 3,952,370 | 4/1976 | Greider . |
| 4,007,761 | 2/1977 | Beckman ............. 138/118.1 X |
| 4,013,099 | 3/1977 | Gerigk et al. ........... 138/109 |
| 4,033,382 | 7/1977 | Eichin .................. 138/118.1 |
| 4,064,673 | 12/1977 | Gerigk et al. ............. 53/3 |
| 4,132,047 | 1/1979 | Gerigk et al. .......... 138/118.1 |
| 4,245,674 | 1/1981 | Nakamura et al. ......... 138/109 |

FOREIGN PATENT DOCUMENTS

| 2551452 | 5/1976 | Fed. Rep. of Germany . |
| 2809585 | 9/1979 | Fed. Rep. of Germany . |
| 2291015 | 6/1976 | France . |
| 2001234 | 1/1979 | United Kingdom . |

Primary Examiner—James E. Bryant, III
Attorney, Agent, or Firm—Schwartz, Jeffery, Schwaab, Mack, Blumenthal & Koch

[57] ABSTRACT

Disclosed is a supporting sheath for a longitudinally shirred packaging tube, comprising a generally tubular shaped supporting sheath comprised of a thermoplastic synthetic resinous material and having an inside diameter slightly larger than the outside diameter of the shirred packaging tube and a length substantially greater than the length of the shirred packaging tube, so that when a shirred packaging tube is placed inside of the supporting sheath, two projecting ends of the supporting sheath remain; a pair of generally planar disk elements, each including a central aperture therein, each of the disk elements having an outer diameter which is approximately equal to the diameter of the supporting sheath; each of the disk elements being adapted to be slid with its aperture over one of the projecting ends of the supporting sheath and abutted against the end of the shirred packaging tube contained in the supporting sheath and being adapted to contact the supporting sheath at least along its planar surface facing away from the packaging tube and along its outer circumferential edge when the sheath is turned back 180° upon itself; and wherein each of the turned-back projecting ends of the supporting sheath has a permanently form-stable configuration produced by heat forming. Also disclosed is a functional unit comprising the supporting sheath and a shirred packaging tube, as well as a method for producing the functional unit.

18 Claims, 5 Drawing Figures

SUPPORTING SHEATH FOR A LONGITUDINALLY SHIRRED PACKAGING TUBE

BACKGROUND OF THE INVENTION

The present invention relates to a supporting sheath for a longitudinally shirred packaging tube, to a functional unit comprised of the supporting sheath and the packaging tube contained therein and to a process for its preparation.

Meat products in the form of sausage emulsions filled into synthetic sausage casings are marketed in large quantities. Particularly preferred materials for the synthetic sausage casings are fiber-reinforced cellulose hydrate, collagen, or synthetic polymers such as, for example, polyesters or polyamides.

In the production of sausages, one begins with tubular pieces of a predetermined length, for example, of approximately 20 m. These tubular pieces are gathered in a known manner by means of conventional devices, for example, with tight pleating, into cylindrical, hollow sticks or rods open on both ends and are subsequently or during the process compressed axially in the direction of their longitudinal axis. This is known as shirring. Following the gathering of a tubular piece of the above-mentioned length, the self-supporting hollow stick or rod formed in this manner has a length of approximately 40 cm.

When the packaging tube forming the hollow stick is to be filled with sausage emulsion, it is first closed at one of its ends and then the hollow stick is, with its open end forward, pushed onto the stuffing horn of a sausage filling machine. The sausage emulsion is then continuously and under pressure filled into the hollow stick, which is thereby unfolded according to the amount of sausage emulsion pressed into the tube.

The hollow sticks or rods used possess a certain inherent rigidity provided by the manufacturing process, but they are sensitive to bending stress and easily break into two or more pieces, which are linked together by unfolded tubular pieces. The gathered tube forming the hollow stick is exposed to strong mechanical stresses during the filling process. For this reason, hollow sticks consisting of gathered tubular pieces of cellulose hydrate, are moistened prior to filling, in order to make them flexible.

As a result of the absorption of water by the tube and the subsequent swelling, there is the danger of an undesirable longitudinal expansion of the hollow stick and of damage to the stick during subsequent handling.

The danger that the hollow stick may lose its original shape and dimension because of the above-mentioned effect is particularly great when the tube forming the hollow stick has a relatively thick wall, for example, having a thickness of 0.07 mm, and has a relatively large internal diameter, for example, of 40 mm.

In DE-OS No. 25 10 637 a functional unit of the general type mentioned above is described. However, the extensions of the casing forming the turned-back portions have no elements preventing the subsequent independent return of the turned-back portions to their original shape. There is therefore the risk of the uncontrollable, at least partial returning of the turned-back portions to their original shape, together with an undesirable loosening of the seat of the supporting sheath on or around the hollow stick, so that the supporting sheath is no longer capable of adequately performing its function in relation to the fixation of the shape and dimensions of the hollow stick, particularly in the case of moistened hollow sticks.

SUMMARY OF THE INVENTION

It is therefore an object of the present invention to provide an improved supporting sheath for a shirred packaging tube.

Another object of the invention resides in providing an improved functional unit wherein the ends formed by turned-back extensions of the casing over annular disks are secured with respect to their structural configuration against spontaneous changes in their shape and their spatial arrangement or position in relation to the hollow stick, without the application of additional elements such as locking rings.

It is also an object of the present invention to provide a process for producing the improved functional unit according to the invention.

In accomplishing the foregoing objects, there has been provided in accordance with the present invention a supporting sheath for a longitudinally shirred packaging tube, comprising a generally tubular shaped supporting sheath comprised of a thermoplastic synthetic resinous material and having an inside diameter slightly larger than the outside diameter of the shirred packaging tube and a length substantially greater than the length of the shirred packaging tube, so that when a shirred packaging tube is placed inside of the supporting sheath, two projecting ends of the supporting sheath remain; a pair of generally planar disk elements, each including a central aperture therein and each having an outer diameter which is approximately equal to the diameter of the supporting sheath; a first of the disk elements being adapted to be slid with its aperture over one of the projecting ends of the supporting sheath and abutted against a first end of a shirred packaging tube contained therein and being adapted to contact the supporting sheath at least along its planar surface facing away from the packaging tube and along its outer circumferential edge when the sheath is turned back 180° upon itself; a second of the disk elements being adapted to be slid with its aperture over the other of the projecting ends of the supporting sheath and abutted against the second end of a shirred packaging tube contained therein and being adapted to contact the supporting sheath at least along its planar surface facing away from the packaging tube and along its outer circumferential edge when the sheath is turned back 180° upon itself; and each of the turned-back projecting ends of the supporting sheath having a permanently form stable configuration produced by heat forming.

In accordance with another aspect of the present invention, there has been provided a functional unit suitable for the manufacture of sausages, comprising a longitudinally shirred packaging tube, and a supporting sheath surrounding the shirred packaging tube, wherein the supporting sheath comprises the supporting sheath defined above.

In an alternate embodiment of the functional unit according to the invention, an annular circumferential restriction of the projecting ends exists within the area between the respective disk members and the end surface of the packaging tube, most preferably in the form of a locking ring comprised of an elastic material.

According to still another aspect of the invention, there has been provided a method for producing the foregoing functional unit, comprising the steps of placing the shirred packaging tube in a generally tubular shaped supporting sheath comprised of a thermoplastic synthetic resinous material and having an inside diameter slightly larger than the outside diameter of the shirred packaging tube and a length substantially greater than the length of the shirred packaging tube so that when the shirred packaging tube is placed inside of the supporting sheath, two projecting ends of the supporting sheath remain; providing a pair of generally planar disk elements, each including a central aperture therein and each having an outer diameter which is approximately equal to the diameter of the supporting sheath; sliding a first of the disk elements with its aperture over one of the projecting ends of the supporting sheath and abutting the first disk element against a first end of the shirred packaging tube contained in the supporting sheath; sliding a second of the disk elements with its aperture over the other of the projecting ends of the supporting sheath and abutting the second disk element against the second end of the shirred packaging tube contained in the supporting sheath; turning back 180° upon itself each of the projecting ends of the supporting sheath, so each disk element contacts the supporting sheath at least along its planar surface facing away from the packaging tube and along its outer circumferential edge; and providing by heat forming a permanently form stable configuration to each of the turned-back projecting ends of the supporting sheath.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 3:
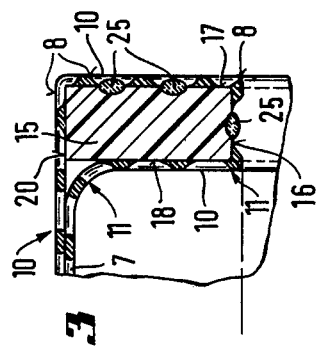
FIG. 3 is a detailed view of the partial area III of FIG. 1 at an enlarged scale.

The supporting container surrounding the hollow stick and designed in accordance with the invention is secured with respect to its shape and dimensions as a consequence of the particular structural configuration of its ends.

Within the scope of the intended uses of the functional unit there is to be included its storage, transportation and exposure to water for the purpose of moistening the hollow stick and the tube forming it.

The functional unit comprises (1) a self-supporting hollow stick or rod formed by the linear gathering of, preferably, a fiber-reinforced cellulose hydrate tube, (2) a tubular sheath having a circular cross-section made of a single piece, preferably of a lattice-like structure, of a heat-formable and heat-weldable or heat-sealable, thermoplastic synthetic resinous material, preferably with a latent shrinking capability activatable by the effect of heat, as the supporting container for the hollow stick arranged in the cavity of the hollow sheath, and (3) annular disks to secure the supporting container arrangement on and around the hollow stick.

The wall thickness of the tubular sheath forming the supporting container is not critical, provided that it is adequate for the performance of the supporting function by the sheath.

The tubular sheath forming the supporting container is made of a heat-formable, preferably heat-weldable thermoplastic polymer; it preferably comprises a polyamide, polyvinyl chloride, and more preferably, a polyolefin, particularly preferably, polyethylene.

The length of the sheath section forming the supporting container is selected such that it comprises the length of the hollow stick and additionally a length corresponding to at least twice the diameter of the hollow stick and at the most, one-half of the length of the hollow stick. The internal diameter of the sheath forming the supporting container is adapted to the external diameter of the hollow stick, i.e., it is only slightly larger. The supporting container surrounds the hollow stick while leaving the openings of its cavity free.

The part of the supporting container lying immediately adjacent to the circumferential surface of the hollow stick is designated the jacket of the supporting container. In the case of supporting containers having a sheath with a shrinkability which is heat activatable, the shrinkability is not activated within the area of the jacket of the supporting container.

The integral sleeve extensions protruding longitudinally past both ends of the jacket of the supporting container are always adjacent to the jacket of the supporting container and define integral, annular, essentially planar end walls of the supporting container bounding the cavity of the supporting container on both ends.

On the side of each end wall of the supporting container facing away from the hollow stick there is located an annular disk having a central, circular opening and adequate inherent rigidity. It consists of a thermoplastic, preferably heat-weldable synthetic resinous material, for example, a polyamide, polyvinyl chloride and, more preferably, polyethylene or polypropylene. Preferably, the annular disks are of the same synthetic material as the supporting container. The thickness of the annular disk is not critical, provided that it has adequate inherent rigidity for the shape stabilizing function of the supporting container.

The annular disk has two flat surfaces, designated as the outer and inner end surfaces, an outer circumferential surface and an annular surface in the annular opening.

The external diameter of the annular disk is adapted to the external diameter of the hollow stick and the diameter of its annular opening is adapted to the diameter of the central annular opening in the end wall of the supporting container. The diameter of the annular opening is thus smaller than the external diameter of the tubular sheath forming the supporting container, so that the annular surface of the annular disk is always pressed tightly adjacent to the respective extension of the sheath.

The integral extension of the sheath protruding from the area of the circular edge defining the end wall of the supporting container is at each end passed through the annular disk and is bent preferably by about 180° in the direction of the center of the hollow stick. The ends of the sheath extensions are in the shape of circular cut edges.

In the process, the extension of the sleeve in each case partially encompasses the annular disk arranged on the end wall of the supporting container so that it lies adjacent to the annular surface, to the external front surface facing away from the ends of the hollow stick and to the external circumferential surface of the annular disk. At least in the area close to its end, the sheath extension lies adjacent to the jacket of the supporting container.

The part of the sheath extension adjacent to the external circumferential surface of each annular disk, together with the part adjacent to the jacket of the supporting container is designated in its entirety as the hollow, cylindrical turned-back part. The length of this hollow, cylindrical turned-back part is at most one half of that of the hollow stick.

The annular area of the sheath extension parallel to the external front surface of the annular disk and immediately adjacent to it forms a flat or bent, annular front wall of the supporting container. This is bounded both at its outer and inner circumference by front wall turned-back edges, wherein the front wall in the area of its outer circumferential edge passes integrally into the hollow, cylindrically-shaped turned-back portion and in the area of its inner circumferential edge into the integral part of the sheath extension, which is adjacent to the annular surface of the annular opening.

Each of the end and front walls of the supporting container and the circumferential edges bounding them extends in a plane to which the longitudinal axis of the supporting container forms at least approximately a right angle.

It is essential in connection with the invention that at least the turned-back edge boundig the outer circumference of each front wall of the supporting container should have a permanently stable configuration provided by means of heat forming, and preferably, the inner circumferentially bordering edges should also be provided with a permanently stable configuration by means of heat forming.

It is also of advantage additionally to provide at least the edge bounding each end wall of the supporting container with a stable configuration by heat forming.

By definition, the above-mentioned, structurally identified end and front walls of the supporting container are to be considered as having a configuration made permanently stable by means of heat forming.

In a preferred embodiment, each extension of the supporting sheath is joined at least in partial areas and at least in spots, with the annular disk by means of heat-welding or -sealing. Preferably, the end wall of the supporting container is also joined with the inner end surface of the annular disk by heat-welding at least in spots. Preferably, the jacket of the supporting container is also joined with the adjacent hollow, cylindrical turned-back part by means of heat-welding, at least in spots.

The configuration of the sheath extensions according to the invention may also be characterized by the features of the manufacturing process by which they are made.

The expression "provided with a permanently form stable configuration by means of heat forming" signifies with respect to the structural configuration of the sheath extensions that the ends of the supporting container will not spontaneously change their shape and dimensions during the intended use of the functional unit at temperatures below the softening point of the thermoplastic material forming the supporting sheath. The permanently form stable configuration of the ends of the supporting container prevents the uncontrolled and undesirable alteration of the shape and dimensions of the hollow stick in the cavity of the supporting container, during the intended use of the functional unit.

The use of the functional unit in sausage making includes the usual moistening of the hollow stick based on cellulose hydrate which is arranged in the cavity of the supporting container.

The annular shaped bends provided in the sheath extensions, i.e., the inner and outer circumferential edges of each end wall of the supporting container and each front wall of the supporting container, are to be considered by definition as having a permanently form stable configuration obtained by heat forming, whenever the sheath extensions can no longer be converted at room temperature to shapes free of edges having permanently form stable configurations, i.e., when, after straightening out at room temperature and removing the annular disks, the turned-back portions can no longer be returned to their original shape in the form of a straight, hollow cylinder without permanently form stable radial edges.

The expression "shaped by heat forming" designates the result of a process measure during the manufacture of the ends of the supporting container and serves to materially characterize the permanently form stable configuration of said edges in relation to the process.

The circumferential edges having a permanently form stable configuration obtained by means of heat forming in the area of the sheath extension of the supporting container are convex bends bent outwardly (bend angle approximately 90°).

The manufacture of the functional unit will be described more fully hereinafter with reference to an example:

The starting materials used consist of (1) a hollow stick of a longitudinally gathered, flexible packaging tube, for example, based on fiber-reinforced cellulose hydrate, (2) a section of a tubular flexible sheath having a uniform circular cross-section over its entire length, for example, with a lattice-like or net-like structure, based on polyethylene, and (3) two inherently rigid annular disks having a stable configuration and a center opening or aperture. The sheath has the capability of shrinking under the effect of heat. The internal diameter of the tubular sheath is adapted to the external diameter of the jacket of the hollow stick. The length of the sheath is selected with respect to the length of the hollow rod so that sheath extensions, preferably of equal length, project on either end past the hollow stick arranged in the cavity of the sheath. The sheath extensions are, for example, of a length corresponding to twice the diameter of the hollow stick.

The annular disks consist, for example, of polyethylene, and the diameter of the annular opening is always smaller than the external diameter of the sheath. It is selected so as to be approximately equal to the internal diameter of the hollow stick.

The hollow stick is arranged in the cavity of the sheath so that the sheath extensions of equal length project past the ends of the hollow stick on both ends. An annular disk is then pushed onto each sheath extension and is pressed against the end wall of the hollow stick, so that a partial area of the sheath extension abuts against the end wall of the hollow stick.

Subsequently, under conditions that prevent a change in the position of the annular disks in relation to the hollow stick, the part of the sheath extension protruding through the annular opening of the annular disk is in each case turned-back around the external end surface and the outer circumferential surface of the annular disk in the direction of the center of the hollow stick. This is accomplished, for example, by means of a device applied to the end of the extension, for example, in the form of pliers. Advantageously, the sheath extension is simultaneously tensioned in the direction of the longitudinal axis. The sheath extension now lies against the inner end wall of the annular disk, the annular surface thereof, the external end wall of the annular disk and the external circumferential surface of the annular disk, as well as advantageously against the jacket of the supporting sheath. Under conditions which prevent the restraightening of the turned-back portions, for example, by using clamp-like elements, the sheath extensions are exposed to heat at a temperature adequate to transform the sheath extensions into a heat-formable and optionally heat-weldable state.

Optionally, after exposure to heat the sheath extensions while still in their heat-formable state are subjected at least in part to pressure, whereby they are pressed against the surface of each annular disk and the jacket of the supporting container, thus effecting at least in part by heat-welding or -sealing joinder of the sheath extension and these surfaces. This heat-welding or -sealing preferably takes place in spots, by use of a heated stamping device.

When shrinkable tubular sheaths are used, the exposure to heat at least partially activates the latent shrinkability of the sheath extensions.

Following the exposure to heat, the functional unit is cooled under conditions which prevent a change in shape of its heated parts. Prevention of a change in shape of the parts during the cooling process may be effected, for example, by the use of suitably designed mechanical holding elements.

The exposue to heat has the effect that the sheath extensions adapt themselves to the contours of the annular disks wherever they are in direct contact with their surfaces. Following the cooling of the areas exposed to heat, their shape is permanently established in a stable manner.

In another embodiment of the invention, a radially elastic locking ring, for example, of a rubber band or an elastic synthetic resinous material, is inserted around the sheath extensions in the area between the annular disk and the jacket of the supporting container. The ends of the container are then exposed to heat at a temperature sufficient to transform the turned-back portions into a heat formable state. Subsequently, the area of the sheath extensions exposed to heat is allowed to cool.

The invention will be explained in more detail with reference to the exemplary embodiments illustrated in FIGS. 1 to 5.

Figure 4:
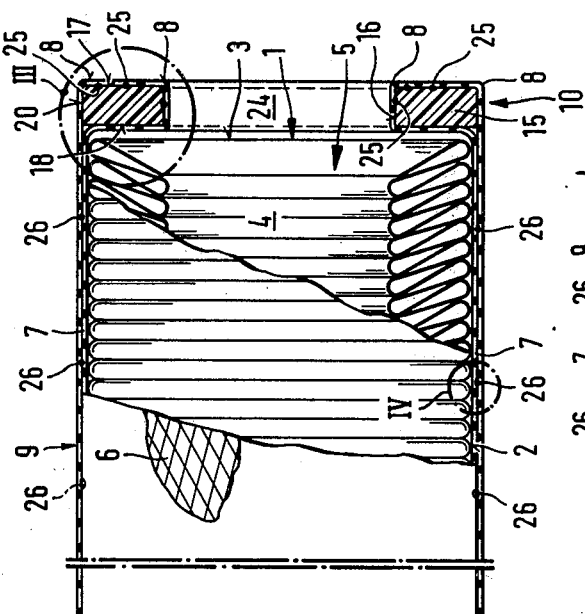
FIG. 4 is a detailed view of the partial area IV of FIG. 1 at an enlarged scale.
Figure 2:
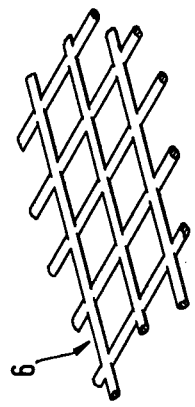
FIG. 2 is a detailed view of a partial area II of FIG. 1 at an enlarged scale.
Figure 1:
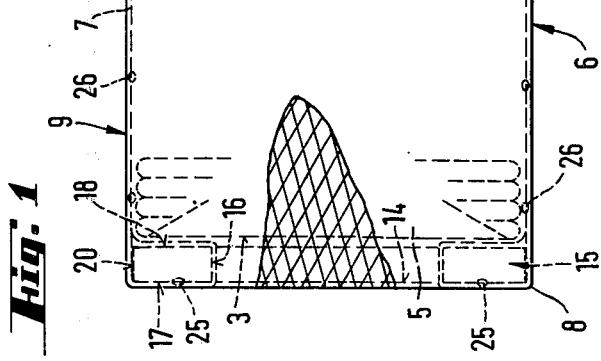
FIG. 1 is a side elevation, partially in section, of a functional unit according to the invention.

In FIG. 1, the hollow stick 1 consisting of a longitudinally gathered packaging tube is surrounded on its external circumferential surface 2 by a jacket 7 of the supporting container and on its end surface 3 by the sheath extension 10. The reference numeral 4 designates the cavity and 5 the openings of the cavity of the hollow stick 1. The hollow, cylindrical supporting container is a net-like structural flexible tube 6, surrounded by the hollow, cylindrical turned-back part 9 thereof. The sheath extension 10 extends in contact with the end surface 3 of the hollow stick 1 and the inner end surface 18 of the annular disk 15, through the annular opening 24, past the inner annular surface 16, the external end surface 17 and the outer circumferential surface 20 of the annular disk 15. The bent areas of the sheath extensions 10, which are preferably permanently form stable in their configuration, are designated by reference numeral 8, and additional advantageously bent areas by the reference numeral 11. The spot welds 25 and 26 connect the sheath extension 10 with the annular disk 15 and for the hollow, cylindrical turned-back part 9 of the sheath extension 10 with the jacket 7 of the supporting container. In FIGS. 2 to 4, the reference numerals have the same significance as in FIG. 1.

Figure 5:
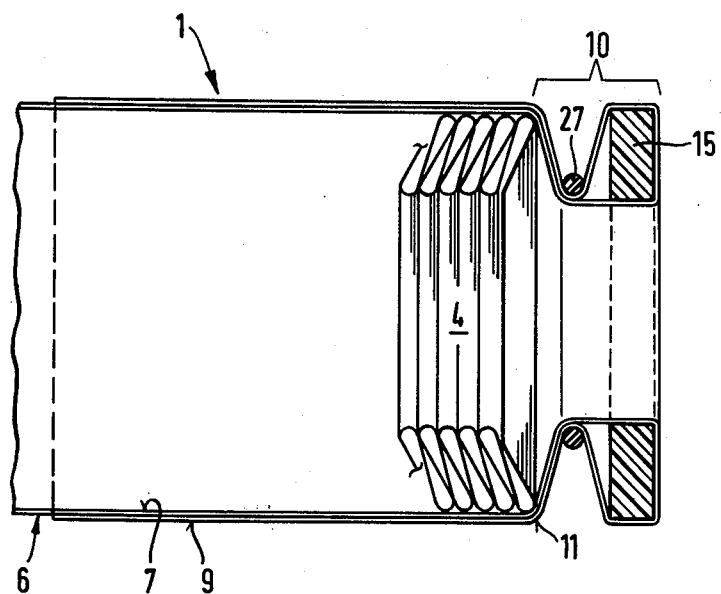
FIG. 5 is a side elevational view of a further embodiment of the functional unit according to the invention having a locking ring, wherein only its terminal part is illustrated.

The reference numeral 27 in FIG. 5 identifies the locking ring, which is arranged between the annular disk 15 and the end surface of the hollow stick 1 and which forms a restriction of the sheath extension 10.

What is claimed is:

1. A functional unit suitable for the manufacture of sausages, comprising:
a longitudinally shirred packaging tube; and
a supporting sheath surrounding said shirred packaging tube, said supporting sheath including:
a generally tubular shaped supporting sheath comprised of a thermoplastic synthetic resinous material and having an inside diameter slightly larger than the outside diameter of said shirred packaging tube and a length substantially greater than the length of said shirred packaging tube, so that when said shirred packaging tube is placed inside of said supporting sheath, two projecting ends of said supporting sheath remain;
a generally planar disk element on each of the projecting ends of said supporting sheath, each disk element including a central aperture therein, each of said disk elements having an outer diameter which is approximately equal to the diameter of said supporting sheath;
a first of said disk elements being slid with its aperture over one of the projecting ends of said supporting sheath and abutting against a first end of said shirred packaging tube contained in said supporting sheath, said first disk element contacting said supporting sheath at least along its planar surface facing away from said packaging tube and along its outer circumferential edge when said sheath is turned back 180° upon itself forming a first turned-back projecting end;
a second of said disk elements being slid with its aperture over the other of the projecting ends of said supporting sheath and abutting against the second end of said shirred packaging tube contained in said supporting sheath, said second disk element contacting said supporting sheath at least along its planar surface facing away from said packaging tube and along its outer circumferential edge when said sheath is turned back 180° upon itself forming a second turned-back projecting end; and
each of said turned-back projecting ends of said supporting sheath having a permanently form stable configuration produced by heat forming.

2. A functional unit as claimed in claim 1, wherein the thermoplastic synthetic resinous material forming said supporting sheath has a shrinking capability activatable by the effect of heat.

3. A functional unit as claimed in claim 1, wherein said synthetic resinous material comprises a polyamide, polyvinyl chloride or a polyolefin selected from polyethylene and polypropylene.

4. A functional unit as claimed in claim 1, wherein said supporting sheath includes a grid-like structure.

5. A functional unit as claimed in claim 1, wherein said disk elements comprise a thermoplastic synthetic resinous material.

6. A functional unit as claimed in claim 5, wherein said synthetic resinous material of said disk elements comprises a polyamide, polyvinyl chloride or a polyolefin selected from polyethylene and polypropylene.

7. A functional unit as claimed in claim 1, wherein each of said projecting ends is also given a permanently form stable configuration by heat forming in the area of its bend around the outer circumferential edge of each disk member.

8. A functional unit as claimed in claim 7, wherein each of said projecting ends is also given a permanently form stable configuration by heat forming in the area of its bend around the edge of the central aperture of the disk member facing away from the packaging tube.

9. A functional unit as claimed in claim 8, wherein each of said projecting ends is also given a permanently form stable configuration by heat forming in the area of its bend around the edge of the central aperture of the disk member located adjacent to the respective end surface of said packaging tube.

10. A functional unit as claimed in claim 9, wherein each of said projecting ends is also given a permanently form stable configuration by heat forming in the area of its bend around the outer circumferential edge of the respective end surface of said packaging tube.

11. A functional unit as claimed in claim 1, wherein each of said projecting ends abuts against the external surface of the supporting sheath surrounding the packaging tube and is connected thereto by means of heat-welding or heat-sealing.

12. A functional unit as claimed in claim 1, wherein each of said disk elements is joined by means of at least spot surfaces with said respective projecting ends of the supporting sheath by heat-welding or heat-sealing.

13. A functional unit as claimed in claim 12, wherein said spot surfaces are located on the outer planar surface of said disk elements.

14. A functional unit as claimed in claim 12, wherein said spot surfaces are located on the inner planar surface of said disk elements.

15. A functional unit as claimed in claim 12, wherein said spot surfaces are located on the outer circumferential surface of said disk elements.

16. A functional unit as claimed in claim 12, wherein said spot surfaces are located on the circumferential surface of said central aperture of said disk elements.

17. A functional unit as claimed in claim 1, wherein an annular, circumferential restriction of said projecting ends exists within the area between the respective disk members and the end surface of the packaging tube.

18. A functional unit as claimed in claim 17, wherein said restriction comprises a locking ring comprised of an elastic material.

* * * * *